(12) United States Patent
Ma et al.

(10) Patent No.: US 11,236,731 B2
(45) Date of Patent: Feb. 1, 2022

(54) CONDUCTIVE RING ASSEMBLY, CONDUCTIVE DEVICE AND WIND TURBINE

(71) Applicant: BEIJING GOLDWIND SCIENCE & CREATION WINDPOWER EQUIPMENT CO., LTD., Beijing (CN)

(72) Inventors: Lei Ma, Beijing (CN); Qingjiang Li, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 724 days.

(21) Appl. No.: 16/074,992

(22) PCT Filed: Jun. 7, 2017

(86) PCT No.: PCT/CN2017/087388
§ 371 (c)(1),
(2) Date: Aug. 2, 2018

(87) PCT Pub. No.: WO2018/103285
PCT Pub. Date: Jun. 14, 2018

(65) Prior Publication Data
US 2019/0072079 A1 Mar. 7, 2019

(30) Foreign Application Priority Data

Dec. 8, 2016 (CN) .......................... 201611124216.4

(51) Int. Cl.
*F03D 15/00* (2016.01)
*H01R 39/08* (2006.01)
(Continued)

(52) U.S. Cl.
CPC ............. *F03D 15/00* (2016.05); *H01R 39/08* (2013.01); *H01R 39/24* (2013.01); *H02K 13/00* (2013.01);
(Continued)

(58) Field of Classification Search
CPC ......... F03D 15/00; F03D 80/82; H02K 13/00; H02K 13/003; H01R 39/08; H01R 39/24;
(Continued)

(56) References Cited

U.S. PATENT DOCUMENTS 3,489,982 A 1/1970 Dauphinee
5,501,604 A * 3/1996 Roopnarine ......... H01R 35/025
439/19

(Continued)

FOREIGN PATENT DOCUMENTS

CN 200987033 Y 12/2007
CN 201260107 Y 6/2009
(Continued)

OTHER PUBLICATIONS

International Search Report dated Jul. 27, 2017; PCT/CN2017/087388.
Australian Office Action dated Feb. 26, 2019: Appln. No. 2017370496.
The First Chinese Office Action dated Feb. 28, 2019; Appln No. 201611124216.4.
Extended European Search Report dated Feb. 19, 2019, Appln No. 17878667.9.
(Continued)

*Primary Examiner* — Ahmed Elnakib

(57) ABSTRACT

Disclosed are a conductive ring assembly, a conductive device and a wind turbine. The conductive ring assembly includes a sun gear, a ring gear and one or more planet gear. The sun gear is located in the ring gear, and the sun gear and the ring gear are coaxially arranged. The one or more planet gear is engaged between the sun gear and the ring gear. The
(Continued)

planet gear is conducted with the sun gear and the ring gear at the same time, so that an electrical signal is transmitted between the sun gear and the ring gear by means of the one or more planet gear. The conductive ring assembly uses a planet gear structure for communication data transmission to improve the interference resistance of the conductive ring assembly.

17 Claims, 2 Drawing Sheets

(51) Int. Cl.
*H01R 39/24* (2006.01)
*H02K 13/00* (2006.01)
*F03D 80/80* (2016.01)
*H01R 39/64* (2006.01)
*F16H 1/28* (2006.01)

(52) U.S. Cl.
CPC .......... *H02K 13/003* (2013.01); *F03D 80/82* (2016.05); *F05B 2260/40311* (2013.01); *F16H 1/28* (2013.01); *H01R 39/64* (2013.01)

(58) Field of Classification Search
CPC ............. H01R 39/64; F16H 1/28; F16H 1/32; F05B 2260/40311; Y02E 10/72
USPC ......................................................... 310/219
See application file for complete search history.

(56) References Cited

U.S. PATENT DOCUMENTS

| | | | | |
|---|---|---|---|---|
| 6,157,147 A | * | 12/2000 | Lin | ........................ H02K 49/02 |
| | | | | 318/9 |
| 2008/0279686 A1 | * | 11/2008 | Demtroder | .............. F03D 15/10 |
| | | | | 416/61 |
| 2012/0043850 A1 | * | 2/2012 | Zhang | .................... H01R 39/28 |
| | | | | 310/219 |
| 2014/0306568 A1 | | 10/2014 | Guina et al. | |

FOREIGN PATENT DOCUMENTS

| | | |
|---|---|---|
| CN | 102011684 A | 4/2011 |
| CN | 202127332 U | 1/2012 |
| CN | 202918118 U | 5/2013 |
| CN | 103457132 A | 12/2013 |
| CN | 205319856 U | 6/2016 |
| CN | 205715605 U | 11/2016 |
| EP | 2669439 A1 | 12/2013 |
| JP | 4438016 B1 | 3/2010 |
| JP | 2014-163190 A | 9/2014 |
| SU | 796964 A1 | 1/1981 |
| WO | 2007085259 A1 | 8/2007 |
| WO | 2012/155175 A1 | 11/2012 |

OTHER PUBLICATIONS

European Patent Office First Office Action dated Sep. 8, 2020; Appln. No. 17878667.9.
The Second Australian Office Action dated Jun. 4, 2019, Appln. No. 2017370496.

* cited by examiner

CONDUCTIVE RING ASSEMBLY, CONDUCTIVE DEVICE AND WIND TURBINE

The present application is a National Phase entry of PCT Application No. PCT/CN2017/087388, filed on Jun. 7, 2017, which claims the benefit of priority to Chinese patent application 201611124216.4 titled "CONDUCTIVE RING ASSEMBLY, CONDUCTIVE DEVICE AND WIND TURBINE", filed with the Chinese State Intellectual Property Office on Dec. 8, 2016, which are incorporated herein by reference in their entireties.

FIELD

The present application relates to the field of electrical technology, and in particular relates to a conductive ring assembly, a conductive device, and a wind turbine.

BACKGROUND

Wind turbines are devices that convert wind energy into electric energy.

A conductive slip ring is a precision power transmission device that utilizes a slipping contact, electrostatic coupling or electromagnetic coupling of a conductive ring to transmit electrical signals and electric energy between a rotating component and a rolling or sliding component of a fixed seat support. In a wind turbine, since a hub of a pitch system rotates along with the impeller and a nacelle is fixed, the slip ring is one of indispensable components in the wind turbine.

Conductive tracks in the conventional slip ring are generally arranged as concentric circles in parallel with each other, so the power line and the communication line are routed in parallel with each other, which may cause a certain degree of electromagnetic interference. Furthermore, since the positions of brushes are unavoidably fixed and the brushes in the communication line are thin, the brushes may be worn seriously after a long time of operation, which may cause unreliable contact of the communication line.

In addition, most of the conduction manners of conventional slip rings are of the brush type, which may cause the transient of the rotating speed of the impeller of the wind turbine due to the transient of the wind speed, and the transient of the speed of the impeller may cause the slip ring mechanism to jitter. This kind of jitter may probably cause unreliable contact of the slip ring, therefore resulting in communication flash.

A main control system of a wind turbine set controls the operation of the pitch system mainly through the slip ring, therefore, communication flashes often occur since the slip ring is interfered, causing stop of the wind turbine set; or since some of the data are interfered, the pitch system receives inaccurate pitch angle instruction data, causing malfunction of the pitch system.

At present, upon failures caused by interferences subjected by the slip ring, the blade retraction and shutdown will be performed immediately to ensure the safety of the wind turbine set. This may cause unnecessary shutdown of the wind turbine, and adversely affect the electric power generation output of the wind turbine set.

SUMMARY

A conductive ring assembly, a conductive device and a wind turbine are provided according to the present application, which address the issues of poor interference-resistance, low stability and reliability of communications of the conventional conductive slip ring.

In a first aspect, a conductive ring assembly is provided, which includes: a sun gear, a ring gear and one or more planetary gears. The sun gear is located in the ring gear, and the sun gear and the ring gear are arranged coaxially. The one or more planetary gears are located between the sun gear and the ring gear, and meshed with the sun gear and the ring gear, and the planetary gears are electrically connected to both the sun gear and the ring gear, which allows electrical signals to be transmitted between the sun gear and the ring gear via the one or more planetary gears.

In a second aspect, a conductive device is provided, which includes the above conductive ring assembly and a rotating shaft. The sun gear is mounted on the rotating shaft, or the ring gear is mounted on the rotating shaft.

In the conductive ring assembly according to the embodiments of the present application, the planetary gear structure is used for performing communication data transmission, which improves the interference-resistance of the conductive ring assembly, improves its capability to cope with the rotating speed jitter, and moreover reduces the wear of the communication line, thereby increasing the stability and reliability of communications of the slip ring.

In the conductive device according to the embodiment of the present application, the conductive ring assembly is used such that the power line and the communication line are separately distributed, and thus the conventional arrangement of the power line and the communication line in concentric circles in parallel with each other is changed into the arrangement of the communication line and the power line in concentric circles perpendicular to each other, which facilitates the reduction of the adverse effects of electromagnetic interference on the communications of the slip ring.

BRIEF DESCRIPTION OF THE DRAWINGS

For more clearly explaining technical solutions of embodiments of the present application, drawings used in describing the embodiments of the present application will be briefly described hereinafter. It is obvious that the drawings described below are merely some embodiments of the present application. For the person skilled in the art, other drawings may also be obtained on the basis of these drawings without any creative efforts.

Figure 1:
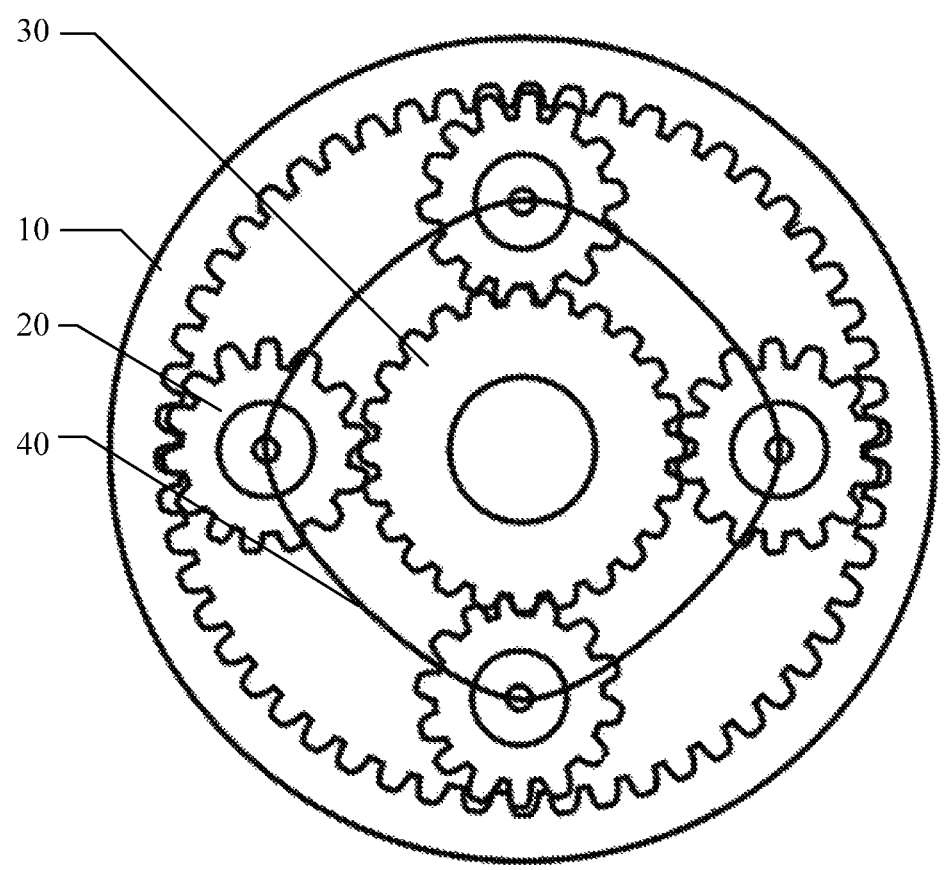
FIG. 1 is a schematic view showing the structure of a conductive device of a conductive ring assembly according to an embodiment of the present application.

| Reference Numerals in the drawings: | |
|---|---|
| 10 ring gear; | 20 planetary gear; |
| 30 sun gear; | 40 planetary carrier; |
| 51 conductive band; | 52 isolation band; |
| 81 first wire connection terminal; | |
| 100 conductive ring assembly; | 200 rotating shaft; |
| 401 conductive track; | 402 conductive brush; |
| 500 power supply wire connection terminal. | |

DETAILED DESCRIPTION

In order to make the objectives, technical solutions and advantages of the embodiments of the present application clearer, the technical solutions of the embodiments of the present application are described clearly and completely hereinafter with reference to the drawings in the embodiments of the present application. Obviously, the described embodiments are a part of the embodiments of the present application rather than all embodiments. All other embodiments obtained by the person skilled in the art based on the embodiments of the present application without creative efforts shall fall within the scope of protection of the present application.

Features and exemplary embodiments of various aspects of the present application will be described in detail hereinafter. In the following detailed description, numerous specific details are set forth in order to provide a thorough understanding of the present application. However, it is apparent to the person skilled in the art that the present application may be implemented without some of these specific details. The following description of the embodiments is merely intended to provide a better understanding of the present application by illustrating examples of the present application. The present application is in no way limited to any specific configuration or algorithm presented below, but covers any modification, substitution and improvement of elements, components and algorithms without departing from the spirit of the present application. In the drawings and the following description, well-known structures and techniques are not shown in order to avoid unnecessarily obscuring the present application.

First Embodiment

As shown in FIG. 1, a conductive ring assembly 100 is provided according to a first embodiment of the present application, which includes: a sun gear 30, a ring gear 10 and a planetary gear 20. The sun gear 30 is located in the ring gear 10, and the sun gear 30 and the ring gear 10 are arranged coaxially. One or more planetary gears 20 are located between the sun gear 30 and the ring gear 10, and meshed with the sun gear 30 and the ring gear 10, and the planetary gears 20 are electrically connected to both the sun gear 30 and the ring gear 10, which allows electrical signals to be transmitted between the sun gear 30 and the ring gear 10 via the one or more planetary gears 20.

The number of the planetary gears 20 may be one, or two or more than two. In conventional designs, the number of the planetary gears 20 is three or four, and the three or four planetary gears 20 are evenly distributed around the sun gear 30 in a circumferential direction of the sun gear 30. In the case that the number of the planetary gears 20 is two, the two planetary gears 20 are arranged on two sides of the sun gear 30 to be symmetric with respect to the center of the sun gear 30.

In the conductive ring assembly 100 according to the first embodiment of the present application, one of the sun gear 30 and the ring gear 10 is connected to a transmission shaft and rotates with the transmission shaft, and the other is connected to a fixed component. Specifically, when the sun gear 30 is mechanically connected to the transmission shaft, the transmission shaft is connected to a shaft hole of the sun gear 30 so as to drive the sun gear 30 to rotate, and the ring gear 10 is immovably secured, and the ring gear 10 may be designed with a wire connection terminal, so as to allow an electrical signal from the sun gear 30 to be transmitted to the wire connection terminal on the ring gear 10 via the planetary gears 20. When the ring gear 10 is mechanically connected to the transmission shaft, the transmission shaft is connected to a circumference of the ring gear 10, and the sun gear 30 is secured to a corresponding fixed component, and electrical signals from the ring gear 10 are transmitted to the wire connection terminal of the sun gear 30 via the planetary gears 20.

In the conductive ring assembly 100 according to this embodiment, the planetary gear structure is employed to transmit communication data, which improves the interference-resistance of the conductive ring assembly 100, and improves its capability to cope with the rotating speed jitter, and moreover, reduces the wear of the communication line, thereby improving the stability and reliability of communications of the slip ring.

The conductive ring assembly 100 according to this embodiment further includes a planetary carrier 40. Each of the planetary gears 20 is pivotally connected to the planetary carrier 40. Correspondingly, the number of the planetary gears 20 is three or more than three, and the planetary gears 20 are evenly distributed around the circumference of the sun gear 30, such that a high coaxiality is maintained between the ring gear 10 and the sun gear 30. The planetary carrier 40 has a through hole at the center, so as to allow the rotating shaft to pass through, and the pivotal connection of the planetary gears 20 to the planetary carrier 40 can ensure that the planetary gears 20 operate more stably in the ring gear 10.

In order to electrically connect the planetary gears 20 to both the sun gear 30 and the ring gear 10, the ring gear 10, the planetary gear 20 and the sun gear 30 may be integrally made of conductive material, for example, the planetary gears 20, the sun gear 30 and the ring gear 10 are generally made of metal. In this way, electrical signals can be automatically transmitted while the ring gear 10 is in mesh with the planetary gears 20 for power transmission and the planetary gear 20 is in mesh with the sun gear 30 for power transmission. However, in order to output the electrical signal, it is necessary to provide the ring gear 10 and the sun gear 30 with corresponding wire connection terminal structures respectively. In the case that the ring gear 10, the planetary gear 20 and the sun gear 30 are made integrally of a conductive material, the non-conductive portions are required to be designed as to be insulated and isolated. For example, two side surfaces of the sun gear 30 are each coated with an insulating film.

In order to fully implement the technical solution of the present application, two conductive ring assemblies 100 may be adopted. The two conductive ring assemblies 100 are installed to be insulated from each other, and are each in communication with one communication line to form a communication circuit. In the implementation, it is also possible that only one conductive ring assembly 100 is adopted as one line of the communication circuit, and the other line of the communication circuit may adopt other circuit structures, such as a commonly used slip ring structure.

That is to say, the object of the conductive ring assembly 100 according to the first embodiment of the present application is to achieve the electrical signal transmission of the communication line by means of the planetary wheel structure, which can be implemented by one conductive ring assembly 100 or two conductive ring assemblies 100.

In the course of implementation, tooth surfaces of the ring gear 10, the planetary gears 20 and the sun gear 30 can be independently designed in consideration of the electrical conductivity of the gear manufacturing material used in the conventional technology and in consideration of the adverse effects of the lubricating oil on the electrical conductivity of the gears during engagement of the gears. That is, it can be designed such that at least the tooth surfaces of the sun gear 30, the ring gear 10 and the planetary gear 20 are of a conductive material. The conductive material includes copper, aluminum, tin, and other metals and alloy materials thereof, or may be graphite. Through designing a conductive material, different from the material of the gears, for the tooth surfaces, the tooth surfaces are enabled to have better electrical conductivity, thereby further effectively ensuring the stability of the communication transmission.

In the course of implementation, alternative embodiments may also be adopted, including:

the tooth surfaces of the sun gear 30, the ring gear 10, and the planetary gear 20 are each covered with a conductive film, and specifically, the conductive film may be attached onto the tooth surfaces by adhering, or may be formed on the tooth surfaces by coating. The conductive film is required to have good wear resistance, which can be readily selected by the person skilled in the art according to the requirements of the implementation, and will not be illustrated here one by one.

Based on the understanding of the person skilled in the art, the tooth surfaces of the sun gear 30, the ring gear 10, and the planetary gears 20 may also be designed in various combined ways. For example, the tooth surface of the ring gear 10 is coated with a conductive film, and a graphite is used for the tooth surface of the planetary gear 20, and the sun gear 30 is made of copper or an alloy material entirely.

Figure 3:
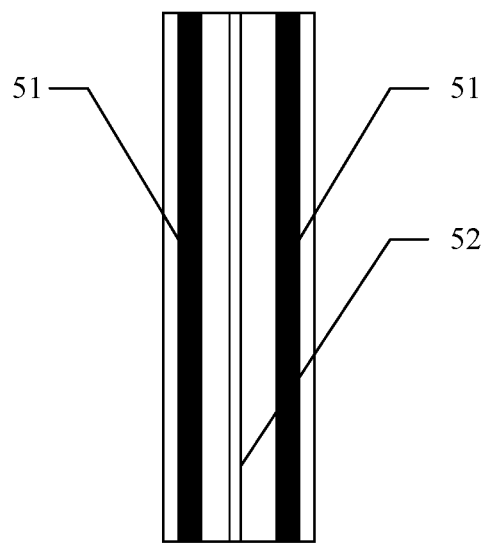
FIG. 3 is a schematic view showing the structure of a planetary gear according to an embodiment of the present application.

In addition to the above embodiments, the conductive ring assembly 100 according to this embodiment may also be implemented by designing multiple conductive bands on the tooth surfaces of the gears. The details are as follows:

as shown in FIG. 3, the tooth surfaces of the sun gear 30, the ring gear 10, and any one of the planetary gears 20 are each provided with two conductive bands 51, and the conductive bands 51 are arranged in the circumferential direction of the gears or the ring gear 10, and adjacent two conductive bands 51 are insulated from each other. When the sun gear 30, the ring gear 10, and the planetary gear 20 are meshed, the conductive bands on the planetary gear 20 are connected to the conductive bands 51 on the sun gear 30 and the conductive bands 51 on the ring gear 10 in a one-to-one correspondence. The conductive bands 51 are of metal, graphite, or a conductive film.

Based on the understanding of the person skilled in the art, the conductive bands 51 may also be designed as three or more than three bands, and when it is required to achieve multipath conduction, the person skilled in the art can implement according to the technical inspiration and teaching of this embodiment. The specific application numbers of the conductive bands 51 are not illustrated here one by one.

In the course of implementation, in order to ensure that the conductive bands 51 are insulated from each other, an isolation band may be designed between adjacent two conductive bands 51. The details are as follows:

an isolation band 52 is provided between the adjacent two conductive bands 51 of the sun gear 30 or the ring gear 10 or the planetary gear 20 to be arranged in the circumferential direction. The isolation band 52 is made of an insulating material for insulating the adjacent two conductive bands 51 from each other.

With the design of the isolation band 52, the insulation performance of the conductive bands 51 can be effectively improved, and the stability of transmission of the electrical signal can be ensured.

The design of the conductive bands 51 can be further improved:

the isolation band 52 on the sun gear 30 and the isolation band 52 on the planetary gear 20 are fitted with each other; and the isolation band 52 on the ring gear 10 and the isolation band 52 on the planetary gear 20 are fitted with each other. The function of the isolation band 52 is not only to isolate and insulate the adjacent conductive bands 51 on the same gear, but also to achieve the electric conduction of the conductive bands 51 when the conductive bands 51 of different gears engage in the process of meshing of the gears, and the conductive bands 51 are better insulated from each other by the isolation band 52. Optionally, the fitting may be a rolling connection, a sliding connection, or a meshing connection. When the rolling connection is adopted, the circumference of each of the isolation bands 52 is designed as a cylindrical surface, and the connection is achieved by the rolling of the cylindrical surfaces against each other. When the sliding connection is adopted, the ratio between diameters of the two insulating bands 52 fitted and connected is designed to be not equal to the transmission ratio of the two gears on the basis of the rolling connection, such that the two isolation bands 52 may have frictional connection therebetween as the gears mesh and transmit power. When the meshing connection is adopted, the isolation bands 52 are designed to have the same shapes as those of the tooth surfaces of the gears respectively, so that the two isolation bands 52 can achieve the meshing transmission. When a clearance fit is adopted, the two isolation bands 52 are designed to maintain a certain gap therebetween on the basis of the above connections, and are not contacted directly.

Optionally, the isolation band 52 has the same height as the height of the tooth surface, and designing the isolation band 52 to have the same height as the height of the tooth surface is to ensure the ease manufacture of the isolation band 52, and the isolation band 52 is designed to have the same shape as the shape of the tooth surface. Optionally, in the course of implementation by the person skilled in the art, it is also possible to implement the isolation band 52 as protruding from the tooth surface, or, alternatively, the isolation band 52 is embodied as being recessed downward from the tooth surface.

Based on the understanding of the person skilled in the art, the isolation band 52 is in a circular shape around the gear. In this way, when two gears are meshed, it is also possible to realize fitted transmission between the isolation bands 52, and also achieve good isolation effect.

The conductive ring assembly 100 according to an embodiment of the present application further includes a first wire connection terminal 81 and a second wire connection terminal.

The first wire connection terminal 81 is arranged on the ring gear 10, and the first wire connection terminal 81 is electrically connected to the sun gear 30 by the ring gear 10 and the planetary gear 20;

The second wire connection terminal (not shown in the drawings) is arranged on the sun gear 30, and the second wire connection terminal is electrically connected to the ring gear 10 by the sun gear 30 and the planetary gear 20.

The first wire connection terminal 81 and the second wire connection terminal function to output electrical signals. It is possible to just use any one of the first wire connection terminal 81 and the second wire connection terminal, and preferably both of the terminals are used.

In the conductive ring assembly 100 according to this embodiment, the planetary gear structure is used for transmitting communication data, which improves the interference-resistance of the conductive ring assembly 100, and the capability of the conductive ring assembly 100 to cope with the rotating speed jitter, and moreover reduces the wear of the communication line, thereby, the stability and reliability of communications of the conductive ring assembly 100 are improved.

In the conductive ring assembly 100 according to this embodiment, since the gears in the planetary mechanism are rotated at a low speed and their positions are continuously changed, the wear of the communication line can be reduced.

In the conductive ring assembly 100 according to this embodiment, since the communication line is embodied as the rotatable gear structure, the contact portion is extended to be the perimeter of one or more planetary gears rather than a set of brushes, so the service life and use time of the slip ring can be extended.

In the conductive ring assembly 100 according to this embodiment, due to a gap presented between the gears in a meshed state, the gap between the gears meshed allows a certain degree of jitter when a sudden change occurs in the rotating speed, and moreover, due to the symmetrical structure of the distribution of the planetary gears, when one side of the planetary gears is in a loose engagement, the other side may be in a tight engagement, so it can prevent an unreliable contact caused by the rotating speed jitter.

The conductive ring assembly according to this embodiment of the present application, can effectively reduce the wear of the communication line compared with the conductive slip ring in the conventional technology for the gears in the planetary mechanism are rotated at a low speed, and their positions are continuously changed. Since the communication line is embodied as the rotatable gear structure, the contact portion is extended to be the perimeter of one or more gears rather than a set of brushes, so the service life and the use time of the slip ring can be extended. The gap between the gears allows a certain degree of jitter when a sudden change in rotating speed occurs, and moreover, due to the symmetrical structure of the distribution of the planetary gears, when one side of the planetary gears is in a loose engagement, the other side may be in a tight engagement, thus it can prevent an unreliable contact caused by the rotating speed jitter.

Second Embodiment

Figure 2:
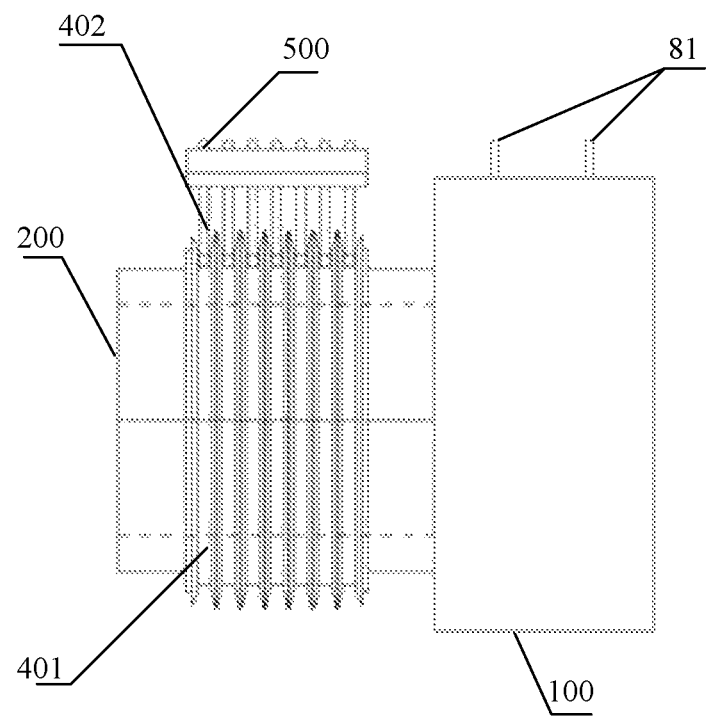
FIG. 2 is a schematic view showing the structure of the conductive device according to an embodiment of the present application.

As shown in FIG. 2, a conductive device is further provided according to a second embodiment of the present application, which includes the conductive ring assembly 100 according to the above embodiment and a rotating shaft 200. According to the requirements of transmission, optionally, the sun gear 30 is mounted on the rotating shaft 200, or the ring gear 10 is mounted on the rotating shaft 200. In the first connection mode, the sun gear 30 is adopted as a driving gear, and the ring gear 10 is mounted to a fixed component, and in the second connection mode, the ring gear 10 is used as the driving gear, and the sun gear 30 is fixedly connected to a fixed component. In the course of implementation, the connection modes can be selected according to the requirement of use.

Optionally, the number of the conductive ring assembly 100 is two or more than two, and the conductive ring assemblies 100 are insulated from each other. The use of two or more conductive ring assemblies 100 can achieve transmission of electrical signals in two or more lines. In the case that the configuration of the conductive bands is adopted, transmission of electrical signals in four or more paths can be realized.

In the case that two or more conductive ring assemblies 100 are used, the conductive device according to this embodiment further includes: an outer sleeve, and the outer sleeve is sleeved and connected onto out sides of the ring gears 10 of all of the conductive ring assemblies 100 so as to fix the ring gears 10 from the outside.

The conductive device according to this embodiment further includes a conductive track 401, a conductive brush 402, and a power supply wire connection terminal 500.

The conductive track 401 is in a ring shape and is fixedly mounted to the rotating shaft 200.

The conductive brush 402 includes a sliding contact end and a fixed end, and the sliding contact end of the conductive brush 402 is in sliding contact connection with the conductive track 401.

The power supply wire connection terminal 500 is connected to the fixed end of the conductive brush 402.

The rotating shaft 200 is connected to the rotating part (which may be the ring gear 10 or the sun gear 30) of the conductive ring assembly 100 and drives the rotating part to rotate. When the electrical signal's conduction and communication transmission are achieved through the rotating part, it is also possible to achieve the electrical transmission of the power part through the conductive track 401, the conductive brush 402 and the power supply wire connection terminal 500, thus, the power part and the communication part are transmitted separately, the mutual interference between the transmissions of the power part and the communication part are reduced, and the power part (constituted by the conductive track 401, the conductive brush 402 and the power supply wire connection terminal 500) and the communication part (i.e., the conductive ring assembly 100) can be separately maintained.

Since the communication part adopts the form of gear transmission, when a radial jitter occurs in the rotating shaft 200 under the co-action of multiple planetary gears, the amplitude of the jitter can be reduced effectively by the meshing effect of the planetary gears 20 in the circumferential direction of the sun gear 30, and the planetary gears 20 and the sun gear 30 can maintain a close contact during the jitter, thus effectively preventing an unreliable contact when the rotating shaft jitters.

Since the position of the sliding contact end of the conductive brush 402 is fixed, and the meshing positions of the planetary gears 20 are continuously changed, so the transmission direction of communications is perpendicular to the transmission direction of the power line (the transmission direction of the power line is a circumferential direction of a circle concentric with the sun gear), and the interference-resistance of the conductive ring assembly 100 can be improved.

Third Embodiment

A wind turbine is further provided according to a third embodiment of the present application, which is provided with the conductive ring assembly 100 according to the above first embodiment and a hub, and the conductive ring assembly 100 is mounted on a rotating shaft of the hub.

A wind turbine is further provided according to the third embodiment of the present application, which is provided with the conductive device according to the above second embodiment and a hub, and a rotating shaft of the hub serves as a rotating shaft of the conductive device.

In the wind turbine according to this embodiment, the planetary gear structure is used for performing communication data transmission, which improves the interference-resistance of the conductive ring assembly 100, improves the capability of the conductive ring assembly 100 to cope with the rotating speed jitter, and also reduces wear of the communication lines, thereby improving the stability and reliability of the communication of the conductive ring assembly 100.

In the wind turbine according to this embodiment, since the gears in the planetary mechanism are rotated at a low speed and their positions are continuously changed, the wear of the communication line can be reduced;

In the wind turbine according to this embodiment, since the communication line adopts the rotatable gear structure, the contact portion is extended to be the perimeter of one or more planetary gears rather than a set of brushes, so the service life and use time of the slip ring can be extended.

In the wind turbine according to this embodiment, since a gap is presented between the gears in a meshed state, the gap between the meshed gears allows a certain degree of jitter when a sudden change in rotating speed occurs, and moreover, due to the symmetrical structure of the distribution of the planetary gears, when one side of the planetary gears is in a loose engagement, the other side may be in a tight engagement, thus the unreliable contact caused by jitter of the rotating speed can be prevented.

In the wind turbine according to this embodiment, the power line and the communication line are distributed separately, and the original arrangement of the lines in concentric circles in parallel with each other is changed into an arrangement of the lines perpendicular to each other, which is beneficial to reducing the adverse effects of electromagnetic interference on the communication of the slip ring.

Merely embodiments of the present application are described above, but the protection scope of the present application is not limited thereto. Various equivalent modifications or substitutions easily conceivable by any person skilled in the art within the technical scope disclosed by the present application should be covered within the scope of the present application, therefore, the protection scope of the present application shall be subject to the protection scope of the claims.

What is claimed is:

1. A conductive ring assembly, comprising:
   a sun gear,
   a ring gear, and
   one or more planetary gears,
   wherein the sun gear is located in the ring gear, and the sun gear is arranged coaxially with the ring gear, and the one or more planetary gears are located between the sun gear and the ring gear, and meshed with the sun gear and the ring gear, the planetary gears are electrically connected to both the sun gear and the ring gear, which allows electrical signals to be transmitted between the sun gear and the ring gear via the one or more planetary gears,
   wherein the tooth surfaces of the sun gear, the ring gear and the planetary gears are each provided with two or more conductive bands which are arranged around the gears or the ring gear in a circumferential direction of the gears or the ring gear, and adjacent two conductive bands are insulated from each other, and when the sun gear and the ring gear mesh with the planetary gears, the conductive bands on the planetary gears are connected in one-to-one correspondence to the conductive bands on the sun gear and the conductive bands on the ring gear,
   wherein an isolation band is provided between adjacent two conductive bands of each of the sun gear, the ring gear and the planetary gears to be arranged around the gears or the ring gear in a circumferential direction of the gears or the ring gear, and the isolation band is made of an insulation material, which insulates the adjacent two conductive bands from each other,
   wherein the isolation band of the sun gear and the isolation band of the planetary gears are fitted with each other in a one-to-one correspondence; and/or, the isolation band of the ring gear and the isolation band of the planetary gears are fitted with each other in a one-to-one correspondence.

2. The conductive ring assembly according to claim 1, wherein:
   one of the sun gear and the ring gear is connected to a rotating component, and the other is connected to a fixed component; and/or,
   the number of the one or more planetary gears is two or more, and the planetary gears are evenly distributed around a circumference of the sun gear.

3. The conductive ring assembly according to claim 2, further comprising:
   a planetary carrier, wherein each of the planetary gears is pivotally connected to the planetary carrier.

4. The conductive ring assembly according to claim 3, wherein
   at least tooth surfaces of the sun gear, the ring gear and the planetary gears are of conductive material;
   the at least tooth surfaces of the sun gear, the ring gear and the planetary gears are each coated with a conductive film; or
   the tooth surfaces of the sun gear, the ring gear and the planetary gears are each provided with two or more conductive bands which are arranged around the gears or the ring gear in a circumferential direction of the gears or the ring gear, and adjacent two conductive bands are insulated from each other, and when the sun gear and the ring gear mesh with the planetary gears, the conductive bands on the planetary gears are connected in one-to-one correspondence to the conductive bands on the sun gear and the conductive bands on the ring gear.

5. The conductive ring assembly according to claim 3, further comprising:
   a first wire connection terminal arranged on the ring gear, wherein the first wire connection terminal is electrically connected to the sun gear via the ring gear and the planetary gears; and/or,
   a second wire connection terminal arranged on the sun gear, wherein the second wire connection terminal is electrically connected to the ring gear via the sun gear and the planetary gears.

6. The conductive ring assembly according to claim 2, wherein
   at least tooth surfaces of the sun gear, the ring gear and the planetary gears are of conductive material;
   the at least tooth surfaces of the sun gear, the ring gear and the planetary gears are each coated with a conductive film; or
   the tooth surfaces of the sun gear, the ring gear and the planetary gears are each provided with two or more conductive bands which are arranged around the gears or the ring gear in a circumferential direction of the gears or the ring gear, and adjacent two conductive bands are insulated from each other, and when the sun gear and the ring gear mesh with the planetary gears, the conductive bands on the planetary gears are connected in one-to-one correspondence to the conductive bands on the sun gear and the conductive bands on the ring gear.

7. The conductive ring assembly according to claim 2, further comprising:
   a first wire connection terminal arranged on the ring gear, wherein the first wire connection terminal is electrically connected to the sun gear via the ring gear and the planetary gears; and/or,
   a second wire connection terminal arranged on the sun gear, wherein the second wire connection terminal is electrically connected to the ring gear via the sun gear and the planetary gears.

8. A conductive device, comprising the conductive ring assembly according to claim 2 and a rotating shaft, wherein the sun gear is mounted to the rotating shaft, or, the ring gear is mounted to the rotating shaft.

9. A conductive device, comprising the conductive ring assembly according to claim 1 and a rotating shaft, wherein the sun gear is mounted to the rotating shaft, or, the ring gear is mounted to the rotating shaft.

10. The conductive ring assembly according to claim 1, wherein:
    the isolation band is in a circular shape around the respective gear.

11. The conductive ring assembly according to claim 1, further comprising:
    a first wire connection terminal arranged on the ring gear, wherein the first wire connection terminal is electrically connected to the sun gear via the ring gear and the planetary gears; and/or,
    a second wire connection terminal arranged on the sun gear, wherein the second wire connection terminal is electrically connected to the ring gear via the sun gear and the planetary gears.

12. A wind turbine, comprising a hub, and further comprising the conductive ring assembly according to claim 2, wherein the conductive ring assembly is mounted on a rotating shaft of the hub; or,
    the wind turbine further comprises the conductive device according to claim 9, and the rotating shaft of the hub serves as a rotating shaft of the conductive device.

13. The conductive device according to claim 9, wherein the number of the conductive ring assembly is two or more than two, and the conductive ring assemblies are insulated from each other; and/or,
    the conductive device further comprises an outer sleeve sleeved and connected onto an outer side of the ring gear of each of the two or more conductive ring assemblies to fix the ring gear.

14. The conductive device according to claim 13, further comprising:
    a conductive track which is in a ring shape and is fixedly mounted to the rotating shaft;
    a conductive brush comprising a sliding contact end and a fixed end, wherein the sliding contact end of the conductive brush is in sliding contact connection with the conductive track; and
    a power supply wire connection terminal connected to the fixed end of the conductive brush.

15. The conductive device according to claim 12, further comprising:
    a conductive track which is in a ring shape and is fixedly mounted to the rotating shaft;
    a conductive brush comprising a sliding contact end and a fixed end, wherein the sliding contact end of the conductive brush is in sliding contact connection with the conductive track; and
    a power supply wire connection terminal connected to the fixed end of the conductive brush.

16. A wind turbine, comprising a hub, and further comprising the conductive ring assembly according to claim 1, wherein the conductive ring assembly is mounted on a rotating shaft of the hub; or,
    the wind turbine further comprises the conductive device according to claim 12, and the rotating shaft of the hub serves as a rotating shaft of the conductive device.

17. A conductive device, comprising the conductive ring assembly according to claim 1 and a rotating shaft, wherein the sun gear is mounted to the rotating shaft, or, the ring gear is mounted to the rotating shaft.

\* \* \* \* \*